Nov. 13, 1956     E. P. AGHNIDES     2,770,446
GAS AND LIQUID MIXING DEVICE
Filed Feb. 18, 1953

INVENTOR
ELIE P. AGHNIDES

BY *Moore & Hall*

ATTORNEYS

United States Patent Office 2,770,446
Patented Nov. 13, 1956

2,770,446

GAS AND LIQUID MIXING DEVICE

Elie P. Aghnides, New York, N. Y.

Application February 18, 1953, Serial No. 337,506

10 Claims. (Cl. 261—76)

This invention relates to fluid mixing devices and more particularly to an improved device for producing a stream of liquid containing air bubbles throughout the stream. Such a device applied to a conventional water faucet provides a bubbly stream of water which is soft and light to the touch and which possesses numerous advantages not present in a plain water jet or in a sprayed water jet. The present invention is an improvement on the devices shown in my Patent 2,210,846, dated August 6, 1940, and in my Patent 2,316,832, dated April 20, 1943, and is a continuation-in-part of my prior copending application Serial No. 63,110, filed December 2, 1948, entitled Fluid Mixing Device, now U. S. Patent No. 2,633,343 granted March 31, 1953.

It is an important object of the present invention to provide an improved unit for mixing air with liquid to provide a bubbly stream.

It is another object of this invention to provide a mixing unit which may be removed from the mixing device as a unit for cleaning, whereby the parts of the unit are maintained in proper relation to each other, and whereby improper reassembly of the mixer parts after cleaning is avoided.

It is another object of this invention to provide a mixing unit that can easily be replaced by a spare unit.

It is still another object of this invention to provide means to insure proper spacing of the various parts of the device.

It is a further object of this invention to provide an improved mixer having discs and screens of novel construction which properly spaces the discs and screens and which also prevents deformation of the same during handling and cleaning.

Other objects and advantages of the invention will be readily apparent to those skilled in the art from the following description taken in connection with the accompanying drawing.

In carrying out the foregoing objects I provide a casing having a ledge near its outlet end on which a cartridge may rest. Upstream of the ledge the casing has a uniform diameter or bore, and the upstream end of the casing has means (such as threads) for connecting it to a faucet or other source of liquid under pressure. The cartridge has an upstream perforated disc and a downstream screen rigidly attached together preferably by a cylindrical shell engaging the peripheries of the disc and screen. The casing and the shell have air inlet openings in their side walls to feed air into the mixing space which is between the said disc and the said screen. Instead of having the cartridge rest directly on the ledge, an additional mixing screen may rest thereon and the cartridge may rest on that screen. Preferably the cartridge has a lip at its lower end on which one of its screens rest. The screens may be held in place and at the same time air inlets may be provided if sections of the shell are cut and bent to clamp the screen or screens of the cartridge against said lip. Various other features will be described as this specification proceeds.

Figure 1:
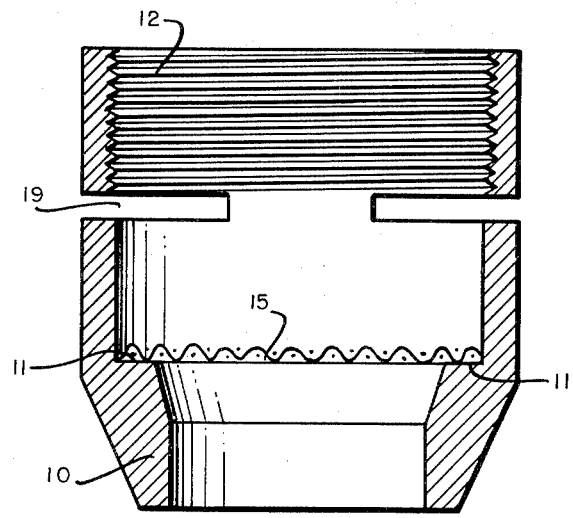
Figure 1 is a cross-section of a casing adapted to receive a unitary cartridge in accordance with the present invention.

Referring now to Figure 1 it will be seen that a casing 10 may be provided having a ledge 11 near its lower or downstream end and having means (such as for example internal threads 12) at its upstream end to connect the same to a faucet or other source of fluid under pressure. The casing 10 has slits 19 in the side walls thereof whereby air may enter the said casing, and the casing is adapted to receive an aerating cartridge that may be removed as a unit therefrom. Preferred such cartridges will be described in reference to Figures 2 and 3, and these cartridges include the perforated discs and screens described in said prior patents, as well as further apertures permitting flow of air from casing slits 19 to the cartridge interior whereby the said cartridges act to aerate water or other fluids as described in my said prior patents. An additional downstream screen 15 may rest on the ledge 11 of casing 10 but this screen 15 may in fact be omitted and the lower edges of the aerating cartridge can then be allowed to rest directly on the ledge 11 if desired.

Figure 2:
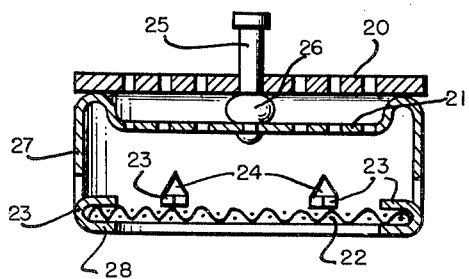
Figure 2 is a cross-section of a cartridge suitable for use in combination with the casing of Figure 1.

One form of cartridge adapted for insertion in casing 10 is illustrated in Figure 2, and this cartridge includes an upper perforated disc 20 slidable along a handle 25 but spaced from a lower perforated disc 21 by an enlargement 26 on the said handle 25. The lower disc 21 comprises the top of an inverted cup 27 which has an annular lip 28 upon which screen 22 rests. The side wall of cup 27 has several slits 24 of inverted V shape which are bent inward to provide clamping member 23 which clamp the screen 22 between members 23 and lip 28, and the apertures resulting from this inward bending of members 23 permit ingress of air to the cartridge interior. The cartridge of Figure 2 is adapted to be inserted into the casing 10 of Figure 1, either with or without the lower screen 15. If desired, enlargement 26 may be eliminated to permit handle 25 to slide readily through both of discs 20 and 21.

Figure 3:
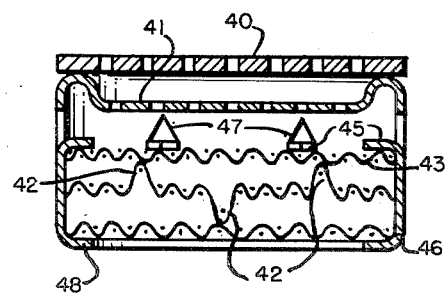
Figure 3 is a cross-section of still another form of cartridge suitable for use in combination with the casing of Figure 1.

An alternative form of cartridge is shown in Figure 3, and in this form perforated discs 40 and 41 are provided as separate pieces which are not interconnected. Disc 41 again comprises the top of an inverted cup 46, and the said cup includes an inturned lip 48 which supports three screens 43. The middle screen has indents and raised portions 42 for spacing the screens from one another as is more fully described in my U. S. Patent No. 2,633,343. In order to clamp the screens 43 together, a series of inverted V shaped slits 47 may again be cut in the side wall of cup 46 and the inverted V member 45 may then be bent inward to press the upper of the three screens downwardly. Again, as was the situation with the cartridge of Figure 2, the cartridge of Figure 3 is adapted for insertion in casing 10 of Figure 1, either with or without screen 15.

Various changes may be made in the devices hereinabove described without departing from the scope of the claims.

I claim to have invented:

1. A device for mixing a gas and a liquid comprising a conduit for the liquid, an inverted cup perforated at its top and having an inturned lip at its open end, screen means in the cup and bearing against said lip, and tabs extending inward from the inner side wall of the cup and limiting the upward motion of the screen means, said cup being located in said conduit, said cup having an air inlet into the same and said conduit having an air inlet feeding air to the air inlet of said cup.

2. A device for mixing a gas and a liquid comprising a conduit for the liquid, an inverted cup perforated at its top and located in the conduit, stop means at the open end of the cup, screen means bearing against said stop means, and a tab cut from the side of the cup and bent inward to limit the upward motion of the screen means, said cup having an air inlet into the same and said conduit having an air inlet therethrough feeding the air inlet in said cup.

3. A device for mixing a gas with a liquid comprising a casing adapted to be connected to a source of liquid under pressure at its upstream end and having a discharge outlet at its lower end, a ledge in the casing adjacent said discharge outlet, the casing having an opening larger than the ledge throughout that portion thereof upstream of the ledge, and a cartridge disposed upstream of said ledge within said casing and removable from said casing as a unit, said cartridge being carried by said ledge and comprising a plurality of foraminous diaphragms spaced from one another within a cartridge housing, tab means extending inward from said cartridge housing adjacent a selected one of said foraminous diaphragms for limiting the upward motion of said selected diaphragm, and a post centrally disposed in said housing between other ones of said foraminous diaphragms for holding said other diaphragms in spaced relation to one another, both said casing and said cartridge housing having air inlets for admitting air between said foraminous diaphragms.

4. A device for mixing a gas with a liquid comprising a casing adapted to be connected to a source of liquid under pressure at its upstream end and having a discharge outlet at its lower end, a ledge in the casing adjacent said discharge outlet, the casing having an opening larger than the ledge throughout that portion thereof upstream of the ledge, and a cartridge disposed upstream of said ledge within said casing and removable from said casing as a unit, said cartridge comprising at least three foraminous disphragms spaced from one another, a central post interconnecting the upper two of said diaphragms, a cylindrical shell connected to said central post and surrounding said lower diaphragm, said shell having a lip extending under the lower diaphragm and a clamping portion extending above said lower diaphragm, said clamping portion comprising elements cut from the wall of said shell and bent over the top of said lower diaphragm, both said casing and said cartridge having air inlets for admitting air between said foraminous diaphragms.

5. The combination of claim 4 wherein said cylindrical shell comprises an inverted cup structure, the lower one of said upper two foraminous diaphragms comprising the top of said inverted cup structure.

6. An aerator comprising a casing adapted to be connected to a source of liquid under pressure at one end and to discharge the jet from its other end, said casing having an air inlet therethrough for admitting air to the interior thereof, an inverted cup in the casing and perforated in the disc portion thereof and having stop means extending inwardly at the open end of the cup, screen means resting on the stop means, and tabs integral with the cup and extending inwardly above the screen means to hold the latter in place, the cup having an opening above each tab to admit air via said casing air inlet and thence via said openings to the space above the screen means.

7. An aerator as defined in claim 6 in which the tab originally filled the opening above it and was bent inward to hold the screen means between it and the stop means.

8. An aerator as defined in claim 6 having a handle carried by the disc portion of the cup, and a second perforated disc above the first one and slidable on said handle.

9. An aerator as defined in claim 6 in which a plurality of parallel screens are interposed between the tabs and the stop means, at least one of the screens having indents to space the screens from each other.

10. An aerator comprising a casing adapted to be connected to a source of liquid under pressure and to discharge the jet from its other end, an inverted cup in the casing and perforated in the disc portion thereof and having stop means extending inwardly at the open end of the cup, screen means resting on the said stop means, tabs integral with the said cup and extending inwardly above the screen means to hold the latter in place, said screen means comprising three parallel screens interposed between said tabs and said stop means, the middle one of said screens having indents and raised portions to space it from the others, said cup having an opening above each tab to admit air above said screen means, and said casing having an air inlet for feeding air to said openings.

References Cited in the file of this patent

UNITED STATES PATENTS

| 994,864 | Montrose | June 13, 1911 |
| 1,457,895 | Campanella | June 5, 1923 |
| 2,210,846 | Aghnides | Aug. 6, 1940 |
| 2,492,037 | Freeman et al. | Dec. 20, 1949 |
| 2,510,396 | Goodrie | June 6, 1950 |
| 2,541,854 | Bachli et al. | Feb. 13, 1951 |

FOREIGN PATENTS

| 219,084 | Switzerland | May 1, 1942 |